March 29, 1960 C. S. F. D. DE SOLLANO ET AL 2,930,699
METHOD OF MILLING CERTAIN CEREAL GRAINS
Filed March 8, 1955 2 Sheets-Sheet 2

INVENTOR.
Carlos S. Fernandez Diez De Sollano
Jose Maria Berriozabal
BY
*H. W. Breloford*
ATTORNEY

United States Patent Office

2,930,699
Patented Mar. 29, 1960

2,930,699

METHOD OF MILLING CERTAIN CEREAL GRAINS

Carlos S. F. Diez de Sollano and José Maria Berriozabal, Mexico City, Mexico, assignors to Process Millers, Inc., Las Vegas, Nev., a corporation of Nevada Application March 8, 1955, Serial No. 493,026

11 Claims. (Cl. 99—93)

Our invention relates to the milling of five of the common cereal grains, wheat, rice, oats, barley and rye, and has particular reference to a process whereby a whole grain cereal product from these grains, such as flour or meal, is obtained that will not turn rancid and will store perfectly over long periods of time, and refers also to the products of such process.

This application is a continuation-in-part of our co-pending application Serial Number 312,632, filed October 1, 1952, entitled Method of Milling Whole Grain Kernels and Product, which in turn was a continuation-in-part of our co-pending application Serial Number 172,274, filed July 6, 1950, entitled Method of Milling Whole Grain Kernels and Product.

The invention is based on the discovery of a novel method of milling whole cereal grains wherein the natural enzymes of the grain that cause rancidity become deadened or destroyed, and resulting in a dry, comminuted and sterile product that is nonrancidifying in character.

The word "enzymes" as used herein refers to the enzymes that cause rancidity including esterases such as lipase, lecithinase, etc.

The enzymes are the active agents causing rancidity and when these chemical substances are denatured or destroyed rancidity is avoided. While various treatments are known to destroy enzymes, the better known processes produce undesirable effects in the taste, nutrition and value of the flour. This invention leaves no undesirable characteristics. The nutrition of the natural oils and fats is retained as well as the vitamin content. Protein is largely unaffected, and the digestible content is actually increased. The flavor of the flour and its products is not only pleasing and highly acceptable but is an improvement over flour of any type heretofore available in commerce.

More particularly, the novel method of the invention comprises the steeping of the whole cereal grains in an aqueous solution under controlled conditions of temperature and time of steeping, followed by the simultaneous comminution and dehydration of the steeped grains under controlled temperature conditions. The natural enzymes of the grains are debilitated in the steeping step of the method and are finally destroyed in the combined comminuting and dehydrating step while the comminuted resultant product is completely sterilized during the performance of the second step of the method. Simultaneous comminution and dehydration of the steeped grains may be effected by comminuting the steeped grains in a grinding mill, preferably of the hammer type, while simultaneously subjecting the steeped grains, as they are being comminuted, to the dehydrating action of heated gases. We have discovered that certain temperature conditions will effect sterilizing despite evaporative cooling effects. The two factors of enzyme control and sterilization coact with each other to produce whole cereal grain ground products possessing long shelf life. The invention prevents enzyme action by deadening and destroying the natural enzymes of the grain by a combination of thermal, chemical, and mechanical actions, and prevents creation of enzymes by bacteria and fungi by sterilizing the ground product.

The fact that bacteria and molds can cause formation of the different enzymes is well established. Thus, even complete deadening of the natural enzymes will not prevent rancidity if bacteria and fungi are allowed to react or multiply. The present invention kills these growths by sterilizing the grain without adversely affecting the resultant product.

As will appear more fully hereinafter, hot water alone may be employed in the steeping step. On the other hand and when treating certain cereal grains and for securing final products of a desired fineness of texture and quality, alkaline solutions may be used, and in certain instances acid solutions may be utilized.

While various types of mills may be used in our milling process, we prefer at present to use rotary impact mills. We have tested tooth mills and find that they perform a grinding operation but that it is difficult to obtain a dried product from them. Ball mills under suitable conditions and with modifications for passing air therethrough could be used. However, from a commercial standpoint we prefer to employ impact mills having a self-grading or self-separating action.

Various means for wetting or steeping the grain may be employed. For example, the grain may be hot soaked in water or various other aqueous liquids may be employed. We prefer, however, in making a finely textured product, such as flour, to use a partial hydrolization treatment for the cellulose by employing a strong alkali, preferably calcium hydroxide, although sodium hydroxide or potassium hydroxide could also be used. When the grain is steeped in an alkaline solution, the cellulose of the hull of the grain is partially converted to hemicellulose and other components of the hull are converted to saccharides. Other types of chemicals could also be used to convert the cellulose; such as acids for example.

The final comminuted product of our process may be a whole grain flour containing all of the ingredients of the original hydrolized grain kernel, including fats, oils, vitamins, protein and starch. Thus maximum nourishment from the grain is assured in our product. No rancidity develops in our flour, inasmuch as the enzymes which create rancidity are destroyed in the milling operation constituting the present invention. Also, the flour is sterile; fungi and bacteria being killed during the milling operation. There is no possibility of the survival of insects or their eggs or larva during the milling operation. The flour has a good white color for grains that have a white core or body, such as white rice and wheat, but of course will be colored when made from grains which have a color throughout, such as rye. The final product is very palatable and has good physical characteristics for flour from the particular type of grain used. The final product is not as fine as white bolted wheat flour but is fine enough for most types of baking. It can be readily enriched either before, after, or during the milling operation, to include extra vitamins, minerals, proteins, etc.

Whole kernel cereal grains heretofore have been disintegrated in mills of various types, including impact mills. The hulls of the grains are so tough, however, that the final product generally was not a flour, but instead a coarse product. We have discovered, however, that if the hulls are thoroughly softened and weakened, that they, as well as the body of the kernel, may be minutely disintegrated. Grain thus softened, however, has a very high water content, which may be as great as 50%, and this gives rise to a severe problem in obtaining a dry flour. We have discovered also that this moisture may be removed by the simultaneous comminution and dehydration set forth above. An integral part of our invention therefore includes the use of a very strong and rapidly acting dehydrating agent, so that the grain will be dried as the comminuting progresses. In the preferred form of our invention we use a steady blast of extremely hot air to bring about this dehydrating action. Thus by the time the grain is ground to the fineness of flour, it is very dry, with a moisture content of about 8%.

The action of the process on the enzymes is the important action determining keeping qualities. The limits of various factors of the process are determined, however, by the effect of the process on the major components of grain, first, on the cellulose of the hulls, second, on starch content of the kernel, and third, on the protein of the kernel.

First, with regard to the action on the cellulose of the cereal grains, this refers only to acid or alkali steeping and does not refer to hot water steeping which has only minor effects on the cellulose. The cellulose of the hulls is hydrolized by the water solutions of CaO or CaO and NaOH mixtures, provided pH is not less alkaline than 11.5 and temperature is not less than 68° C. for a suitable time. The time duration of the steeping depends upon the pH and temperature, lower pH generally requiring longer steeping times and higher pH generally requiring shorter steeping times. For 68° C. temperature about two hours is required. At 78° C. about one hour is required and at 82° C. about a half hour is ordinarily required.

The chemical effect of alkaline solutions on the cellulose is not definitely known but may be that of depolymerization. The cellulose breaks down into hemicellulose. Other components of the bran or hull are converted into mucilaginous dextrins and monosaccharides, improving the palatability, digestibility and appearance of the resulting whole grain flour. The subsequent drying does not affect these bran or hull derivatives. Inefficient or incomplete chemical steeping is the cause of poor grinding characteristics, with the flour having larger hull fragments and a higher fiber content, limiting its suitability for certain products, for example, tortillas.

Acid aqueous baths for effecting hydrolization of the cellulose of the hull may be between pH 4 and pH 0.2. Phosphoric, hydrochloric and sulphuric acids may be used, followed by a suitable wash or neutralization to raise the pH to about pH 7 for all purpose flour and to above pH 7 for non-yeast flour. Edible acids are preferred for neutralization of grain hydrolyzed by alkali. Washing and neutralization should be performed at lower temperatures than steeping because the water penetration and hence gelatinization progresses with time of exposure to water.

The chemical steeping of the grain so weakens the hulls that fine flour is produced. The cellulose is substantially weakened, permitting the hulls to be finely divided, in contrast to the tough flinty hulls of natural grain. The chemical attack, and to a lesser extent hot water, weakens the binding material between the cellulose fibers, weakening the bran or hull in this fashion also. When non-chemically steeped grain is employed the hull fragments are large, and being quite light in addition to being tough it is almost impossible to pulverize these to flour fineness. When the grain is chemically steeped, flour is readily obtainable of a fineness that 95% will pass on 80 mesh screen and 100% will pass a 50 mesh screen.

Second, with regard to the action on the starch content, gelatinization is the most important effect to be considered. The type of gelatinization referred to is the forming of a colloidal suspension or gel due to hydrolysis of starch. If the starch of flour is gelatinized, the dough obtained therefrom may have normal elasticity and plasticity, but is too sticky and glue-like for commercial operations and is unsuited for certain bakery products.

The steeping action gives, of course, a high water content to the grain, and after penetrating the hull the water begins penetration of the starch. The combination of moisture and temperature causes gelatinization and once the reversible phase is passed the flour will be permanently gelatinized despite subsequent drying. The higher the temperature, the greater the gelatinization and most grains are partially gelatinized by steeping in an aqueous bath of 82° C. if the steeping time is in excess of a half hour. Therefore, while high moisture and high temperatures increase the debilitating action on the enzymes, these factors are adverse to the flour because of gelatinization.

The drying action, which employs very high temperatures does not cause gelatinization because of the effects of evaporative cooling. The higher the water content, the greater is the cooling action. The quantity of hot air and quantity of steeped grain should be carefully regulated so that the final temperature of the dry flour will not exceed 73° C., such being below gelatinization because of the low water content of the finished flour. If too much air is used or if the air is too hot, the flour has a higher temperature, and at extreme temperatures caramelization and toasting takes place which is deleterious for baking purposes.

Third, regarding the proteins, there is a distinct difference in flours and meals having plain hot water steeping compared to those having a proper alkaline solution steeping. The bases react chemically with the protein present to change the physical characteristics of the resulting dough. Alkaline steeped grain gives rise to a dough that is more elastic and plastic than dough from water steeped grain or improperly steeped grain. The exact chemical reactions are not definitely known, but undoubtedly various protein complexes are formed from the combined action of calcium or sodium, temperature, pH and water content. The hot alkaline solutions act first on the protein of the hull, and then on the protein of the embryo and the starch-gluten of the endosperm adjacent to the hull. The enzymes, which are proteins, are affected at the same time.

The effect of steeping temperature is not important on the proteins, and maximum steeping temperatures are determined by starch reactions. Conversely, maximum flour temperatures in the drying are determined by the protein and have little effect on the starch. If the final flour temperature is too high the amino acid compounds and the glutamic acid compounds are subjected to a denaturing. Low water content in the flour accompanied by overheating causes in the resulting dough a coagulation and practically a polymerization of the amino compounds. There results poor elasticity and plasticity in the dough. The combination of temperature and moisture in the final flour is important. Therefore, while enzyme control favors high flour temperatures, the denaturing action on the protein and the protein compounds limits the final temperature.

We have found that the preliminary steeping operations, especially the hydrolyzation of the cellulose of the hulls of grain must be carried out quite precisely in order to obtain a commercial product of highest quality. Accordingly, we have devised a continuous process for effecting this steeping or hydrolyzing action which employs mechanical agitation of the grain in the stepping bath, circulation of the liquid, the maintenance of a relatively constant pH in the solution, and a relatively constant temperature. In our present process the drums are perforated so that liquid may freely flow through them, the drums are rotated while immersed in the steeping bath so that all kernels of grain are thoroughly exposed to the liquid. The drums are then bodily picked up, removed to a washing bath and thereafter the drums are emptied to deliver the grain to the impact or other mill employed in the comminuting operation.

It is a general object of the invention to produce from the grains of wheat, rice, oats, barley and rye, whole cereal grain comminuted products as flours and meals that keep for long periods of time and that are non-rancidifying.

It is another object of our invention to provide an improved process for making whole grain flour directly from these five grains.

A further object is to provide a process for the milling of grain wherein the grain is subjected to a cellulose hydrolyzation action and is thereafter milled to a dry product.

Still another object is to provide a milling process for whole grain flours or meals wherein the natural enzymes are deadened and in addition bacteria and fungi are destroyed to form a sterile product.

Another object is to provide a sterile flour from whole grain which will not become rancid and will have good keeping qualities.

Another object is to provide a new and novel process for making whole grain flour suitable for tortillas and other products.

Other objects and advantages of our invention will be apparent in the following description and claims considered together with the accompanying drawings, in which:

Fig. 1 is a schematic illustration of our presently preferred grain steeping or hydrolyzing step which forms an integral part of our milling process and wherein, Fig. 1A illustrates the charging operation, Fig. 1B illustrates the steeping operation and apparatus, Fig. 1C illustrates the washing operation, and Fig. 1D illustrates the dumping operation and apparatus.

Fig. 2 is a simplified perspective view of a perforated drum employable in our apparatus and showing the charging and dumping doors.

STEEPING STEP

Any suitable apparatus may be employed in carrying out the present invention, and the drawings illustrate one form of apparatus which may be utilized.

Figures 1, 1A, 1B, 1C, 1D, 2:
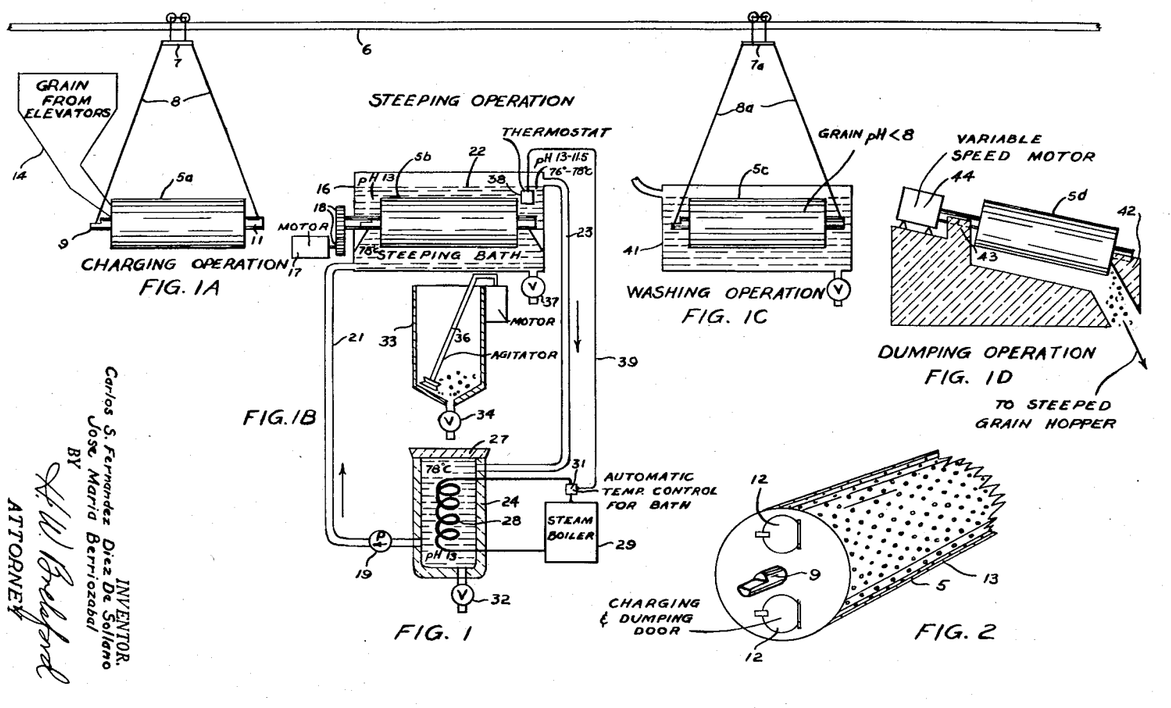

Referring to Fig. 1 there is illustrated the general process for steeping grain in accordance with our invention wherein a series of rotatable drums 5 may be carried from one step to another by means of a rail 6 upon which is disposed a hoist 7. Cables 8 may lead from the hoist 7 to opposite ends of the drums 5 to engage shafts 9 and 11, respectively, projecting from each drum. Each drum 5 may have doors on their ends as illustrated in Fig. 2 at 12. The ends of the drums may otherwise be solid but the cylindrical surface thereof may be perforated with a series of fine perforations 13 which admit liquid but are small enough to prevent the egress of grain. If desired a lining of wire screen may be disposed inside of sheet metal drums having relatively large perforations. The projecting shaft 9 is shown as a split shaft for illustrative purposes only to indicate that a driving connection therewith is possible for rotating the drum 5. It will be appreciated, however, that more suitable mechanical connectors will be employed.

Referring to Fig. 1A grain may be introduced into one end of the drum 5a from an elevator 14 and when this drum is approximately half full of grain it is bodily lifted by the hoist 7 to be deposited within a tank 16, illustrated in Fig. 1B. A driving connection is made between its shaft and a motor 17 which may drive the drum through a pair of gears 18. The shafts of the drum may rest on suitable bearings.

The apparatus of Fig. 1B includes a continuous circulation of steeping liquid by means of a pump 19 driving fluid into an inlet pipe 21 which in turn fills the tank 16 with a steeping bath 22, the level of which is maintained by an overflow pipe 23 which leads to a heat exchanger tank 24. This tank is preferably insulated and has a removable insulated lid 27. The liquid within the tank 24 may be heated by means of steam coils 28 energized by a steam boiler 29 with the flow of steam regulated by a control valve 31. The tank may be provided with a valved outlet 32 for completely emptying the tank or heat exchanger 24.

For grinding most grains to flour we prefer to steep the grains in a calcium hydroxide alkaline solution. This solution may be initially prepared in a tank 33 disposed directly above the heat exchanger 24. It may have a valved outlet 34 and a mechanical agitator 36 may be provided. To form the alkaline solution, a quantity of quicklime (CaO) is introduced together with water into the tank 33 and mechanically agitated. If the quicklime is of high quality and fresh, a pH as high as 14 may be obtained, but more conventionally a pH of 13 is attained as maximum alkalinity with quicklime. An excess of CaO is provided, which settles to the bottom of the tank 33.

The entire steeping solution is preferably renewed once for every ten or twelve batches of grain treated therein, and this is effected by first removing all of the liquid present in the system. Repeated use of the steeping liquid increases the surface tension, decreasing the water content of the steeped grain. The heat exchanger valve 32 is opened as well as a valve 37 on the bottom of the tank 16. When the entire system is emptied, the valves are closed, the lid 27 is removed, and the valve 34 opened in the bottom of the refresher tank 33. The alkaline solution from within the tank 33 together with the excess of calcium oxide is then passed into the heat exchanger 24 and the pump 19 in turn fills the tank 16. The lid 27 may be replaced at the end of the filling step and the steam coils 28 energized to heat the liquid in the entire system. The liquid may be kept accurately under control by means of a thermostat 38 disposed near the outlet of the tank 16 and this in turn controls automatically the valve 31 on the steam coils through an electrical conductor 39. An excess of calcium oxide at the bottom of the heat exchanger maintains the pH in the system constantly at 13.

We have found that for most grains a temperature of 78° C. may be used with the pH 13 to obtain rather complete breakdown of the hull, in a period from one to one and a third hours depending upon the type of grain. In this chemical steeping process part of the cellulose of the hull is converted to hemicellulose, and the binding material for the cellulose fibers is weakened. Not only does this conversion weaken the hull of the grain and condition it for a milling operation, but it also improves the alimentary value of the grain by rendering it more digestible. Additionally, the steeping of the grain in the bath renders it soft so that the hulls of the grain may more easily be broken in the comminuting step. Further, the grain swells so that it nearly fills the drums if the drums were half full of dry grain before chemical steeping.

For some types of products, a washing operation is desirable after the steeping is completed in the tank 16 of Fig. 1B. A hoist 7a may remove the drum 5 therefrom and deposit it in a washing tank 41, illustrated in Fig. 1C. While the drums could be rotated while in this bath it is found that the hulls are sometimes chipped or rubbed if the drum is rotated, and hence a mere dipping type of washing is preferred at present unless removal of the hull is desired. The washing is continued, preferably with warm water, until the surface of the grain reaches a desired pH.

When the washing operation of Fig. 1C is completed the drum is hoisted from the tank 41 and deposited upon bearing supports 42 and 43 so that the drum 5d assumes an inclined position as illustrated. We have found an angle of incline of about 12° is satisfactory. The doors 12 on the right-hand end of the drum 5d are then opened and the drum is rotated slowly by means of a variable speed motor 44. As the drum is emptied, the speed of rotation may be increased by a manual control for the motor 44. The grain accordingly tumbles from the lower end of the drum 5d to a hopper for steeped grain, illustrated in Fig. 3.

While we have described preferred temperatures and alkalinities for our steeping bath of Fig. 1B, as related to the steeping or breakdown of the hull, it will be appreciated by those skilled in the art that various temperatures and alkalinities may be employed. For example, if a quicker hydrolyzing action is desired for grain, either sodium hydroxide or potassium hydroxide or mixtures with calcium hydroxide could be employed as a bath, in which case a pH of 14 is commercially practical. These higher pH's may be very desirable from the standpoint of obtaining a rapid partial hydrolyzation of the cellulose and weakening of the hull. In a rapid hydrolyzation the grain kernel as a whole will pick up less water, requiring less heat to dry the grain during comminuting as will be described with reference to Figs. 3 and 4. If sodium hydroxide or potassium hydroxide is used, phosphoric acid may be also added as soon as the steeping step is finished. For example, the phosphoric acid may be added to the washing bath and will form phosphate salts in the grain kernels as it reacts with the hydroxide, so that the final product will have the highly desirable phosphates therein. Also it will be appreciated by those skilled in the art that substances other than alkalies may be employed to attack the cellulose and, for example, acids of various types could be employed.

We have found with respect to most cereal grains that pH 11.5 is a minimum. If the alkalinity drops below this value the cellulose will not be hydrolyzed regardless of the duration of the steeping operation. If grain is steeped in a bath of deficient alkalinity and is subsequently comminuted, especially in accordance with our process, the hull will flake off of the body portions to which it is attached. Since the hull is of very small mass and of extreme toughness, it will not be comminuted. Instead, it will pass through centrifugal and gravimetric separators as large flakes together with the finely divided body material, giving a coarse quality of flour or meal. The maintenance of a pH of 11.5 or higher is therefore essential and in our process we obtain excellent control of pH as described.

The hydrolyzation of the cellulose of the hull of the grain need be only partial. While the quantitative definition of the words "partial hydrolyzation" is difficult, steeping is deemed to be sufficient when the grain meets an empirical manual balling test. When the steeping has progressed far enough, the hull can be manually removed from the body of the grain but is so lacking in tensile strength that it can be easily wadded up into a gummy ball and rolled between the fingers. If the hull comes off and will not ball together into a mass but retains its original shape of a film or glove over the body of the grain, then the hydrolyzation is incomplete.

The properly steeped hulls are sticky because of the presence of gluten therein and are weakened because part of the cellulose has been converted to hemicellulose and the binding material for the cellulose fibers has been weakened.

The term "partial hydrolyzation" may also be defined in terms of the reduction in crude fiber analysis of raw grain compared to chemically steeped grain. Thus for general purposes the stopping point of chemical steeping may be stated to occur when approximately one-fifth (⅕) of the crude fiber of the grain kernel has been converted to digestible hemicellulose and monosaccharides.

In this connection it should be noted that part of the hemicellulose may show a test reaction as crude fiber.

Proper chemical steeping will not affect the fats and oils and the associated vitamins. If, however, the grain is over-steeped in alkali, the calcium hydroxide will saponify part of the fat, rending it indigestible. Oversteeping does not seem to affect adversely other proteins present but the starch material is partially converted into dextrins making the dough sticky so that it is unsatisfactory for some uses.

As heretofore pointed out the enzymes are debilitated or weakened during the steeping step of the invention and the destruction thereof is completed during the second step of simultaneous comminution and dehydration of the steeped grain.

COMMINUTING, DEHYDRATING STEP

Figure 3:
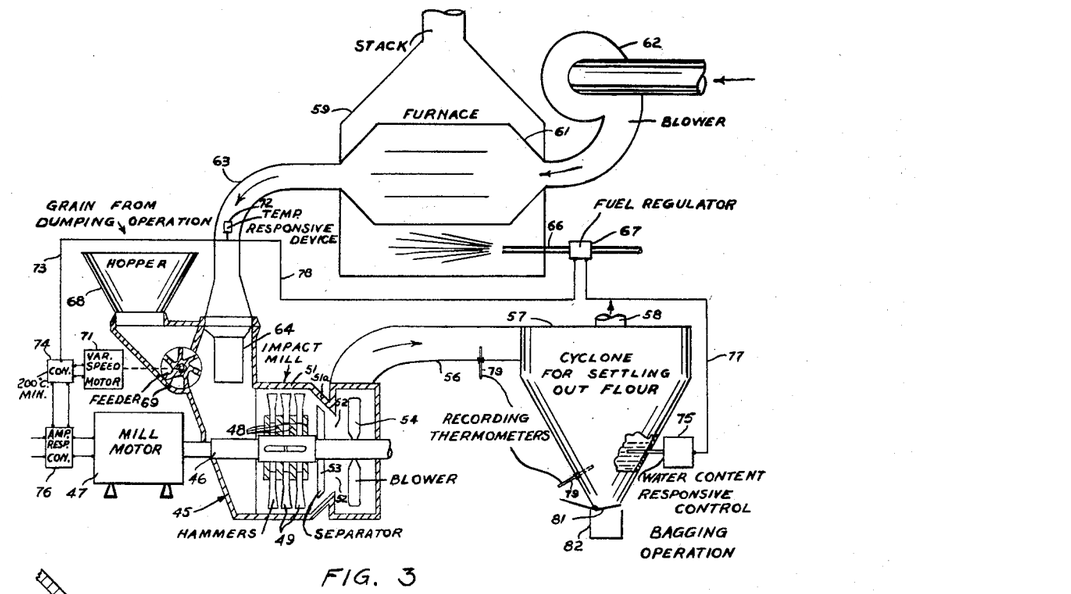
Fig. 3 is a schematic view of the comminuting and dehydrating apparatus which may be employed with our invention and which receives the grain from the dumping operation of Fig. 1.

Illustrated in Fig. 3 is a schematic diagram of the comminuting and dehydrating apparatus which we presently prefer in practicing our invention. While various types of mills can be used we have found that an impact mill is eminently satisfactory for effecting a progressive comminution of the steeped grain kernels. These impact mills are old and well known in the art and are available in various types, sizes and constructions. We prefer, however, at present to employ impact mills having an integral separator therein to classify the outlet materials according to mass. These impact mills generally have a series of plates mounted on a rotatable shaft and hammers are pivoted thereto near the periphery of the plates. These hammers revolve within the mill chamber but are spaced from the walls thereof by a distance of an inch to about ¼ of an inch depending upon the size of the mill. These impact mills effect comminution by striking the particles as they are borne on the turbulent air inside of the mill, breaking them by the blow, dashing them against the cylindrical mill chamber which results in further breaking, and the mill chamber in turn causes them to bounce back into the path of additional hammers.

In the drawing the impact mill may be referred to generally by the numeral 45 and may include a shaft 46 rotated by a mill motor 47 which may be of any type but is preferably an electric motor of constant speed. Mounted on the shaft may be a series of spaced plates 48 having hammers 49 pivoted near their peripheries. These hammers may be of a general elongated construction but will generally assume radial positions during rotation of the shaft 46. The mill may have a cylindrical body member 51 which is tapered as at 51a to form an outlet 52. Mounted on the shaft 46 opposite the tapered portion 51a, may be a series of radial blades 53 which act as centrifugal separators. Heavy or dense material is centrifugally thrown outwardly to the tapered portions of the housing where it is directed into the region of the hammers 49 for further pulverization. A blower 54 may be mounted on the shaft 46 to direct the output of the mill through a conduit 56 to a cyclone 57 wherein the fine flour may be separated or settled out from the air, the clear air exiting through a stack or pipe 58.

As mentioned previously hot air is fed into the impact mill 45 and this hot air may be obtained from a suitable furnace 59 having a closed heater conduit 61 therein for the reception of atmospheric air forced into the conduit by a constant speed blower 62. Directly heated gases may also be used, such as the products of combustion of gaseous or vaporous fuels. After heating in the furnace 59 the air is passed through a conduit 63 to a nozzle 64 disposed in the upper end of the housing of the impact mill. There may be used in the furnace any suitable fuel which is subject to regulation, such as gaseous, liquid or powdered fuel and this may be introduced through a conduit 66 with the flow therein governed by a fuel regulator 67.

The steeped grain from the steeping step of Fig. 1 may be delivered from the dumping operation of Fig. 1D to a hopper 68 and the grain from the hopper may be fed at a metered, regulated rate to the impact mill by means of a rotary feeder 69. This feeder may be driven by a variable speed motor 71 that is preferably electric. A belt feed may be substituted for the rotary feeder 69.

It will be apparent that if grain is fed to the impact mill without the hot air being blasted therethrough, that the grain will be comminuted while in a mushy state and will be deposited over the interior of the mill, clogging the mill and stopping the motor. Accordingly, a temperature responsive device 72 is provided in the conduit 63 from the furnace. This is connected by means of a conductor 73 to a control switch mechanism 74 for the variable speed motor 71 for the feeder. This mechanism 74 is so constructed that it will not energize the motor 71 until the air in the conduit 63 attains a temperature of 200° C. This accordingly prevents the feeder 69 from supplying steeped grain to the mill until an adequate temperature is attained in the air being blasted through the impact mill.

Furthermore, we desire to regulate the speed of the feeder 69 as a function of output of the mill motor 47 so that the maximum output of the mill will be obtained. The maximum mill output can only be obtained when the mill motor is generating maximum power and this in turn may be reflected by the amperage of the electric current consumed by the mill motor. For this reason we provide an amperage responsive control device 76 through which the current for the mill motor passes. This device reflects the amperage of the mill motor to the control 74 so that the variable speed feeder motor will be increased in speed at all times when the mill motor is not operating at maximum power output. In this way the mill is operated at maximum capacity automatically in response to the current consumption of the mill motor, assuming that at all times the furnace is delivering hot air having a temperature of at least 200° C.

Inasmuch as the quality of the product is the major objective in the entire milling process, the primary and overriding control is based upon the quality of the flour produced. This quality may be measured in terms of percentage of water content of the finished flour inasmuch as we have discovered that the keeping quality of flour and meal is almost directly related to the water content, other factors remaining constant. If the air is not hot enough while passing through the impact mill, the water content of the flour will be excessive. If the air is too hot there will be too little water content. Accordingly, we provide a control device 75 that is responsive directly to the water content of the finished flour. For this reason the device is placed toward the bottom of the cyclone 57 so that it may immediately sample the flour as it is delivered fresh from the impact mill. The control device 75 is connected directly by a conductor 77 to the fuel regulator 67 and reduces fuel when the water content is low and increases the fuel when the content is high. Therefore the water content of the flour directly controls the heat of the furnace and overrides any impulse or signal that may be delivered from the feeder control apparatus.

To complete the description of the automatic grain feed and fuel control it should be noted that a conductor 78 leads from the temperature responsive device 72 in the furnace outlet to the fuel regulator 67, completing a path from the motor control 74 to the fuel control 67. The feed control device 74 which governs the variable speed motor 71 also generates an electrical impulse to open or close the fuel regulator 67 in accordance with an increased or decreased grain demand signal from the amperage control 76. In actual practice the entire mill of Fig. 3 reaches a steady state condition in approximately half an hour after it is started. Recording thermometers 79 may be provided in the outlet conduit 58 and the cyclone 57 to indicate the temperatures of the outlet air and the flour respectively.

The automatically controlled system described also automatically compensates for changes in humidity of the atmospheric air being heated and it compensates for changes in the water content of the grain being received by the impact mill. This is because both of these factors affect the water content of the finished product and hence this is immediately reflected to the fuel regulator 67. The control from the amperage responsive device 72 and the water content device 75 are independent, but work together.

While various types of controls for the volume of the air could be devised, we prefer at present to maintain the volume of drying air constant, and obtain drying regulation by varying the temperature, as previously described. Accordingly, the independent blower 62 and the mill blower 54 are selected to have the desired capacity, and they preferably deliver the same output. The blower 62 insures that the air in the furnace will be under a positive pressure. The upper limit of the flow of air through the mill will be determined primarily by the capacity of the separator and the mill, and the lower limit will be that necessary to prevent clogging of the mill, assuming, of course, that the air is heated in both instances. The specifications of the manufacturer of the mill will often be of assistance as a general guide on air flow or volume in employing the mill in our process.

In our process we employ air blasts of extremely high temperature but because of the cooling effect of rapid evaporation, the temperature of the flour is relatively low. As set forth heretofore, a final temperature of 73° C. should not be exceeded, for best results and quality of product. We do not have to regulate the air temperature with respect to the temperature of the flour inasmuch as we find that regulation with respect to the water content of the flour sufficiently regulates its temperature also. For example, when the water content control 75 is set for water contents of 10% to 5%, the flour temperatures are never excessive and generally remain about 65° C.

The finished flour may be packaged directly from the cyclone 57 as we have found that cooling the flour to room temperatures causes deterioration in the quality of the flour if humid or contaminated air is used. This bagging operation is illustrated diagrammatically in Fig. 3 wherein a damper type of shutoff mechanism 81 controls the flow of flour to a receptacle 82. While cloth or paper bags can be used for bagging or packaging our product, we prefer at present to employ a bag of waterproof plastic material inasmuch as this preserves the flour in extreme humidities encountered in tropical lowlands.

Figure 4:
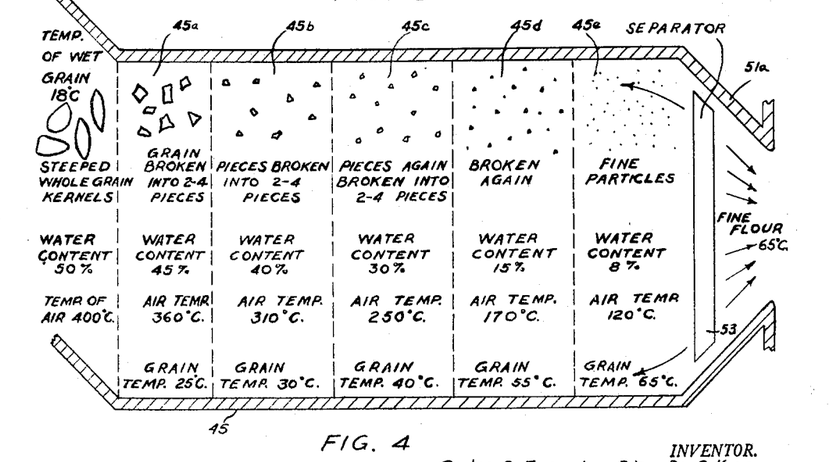
Fig. 4 is a diagram with a description of the processes of comminution and dehydration that take place within the impact mill of Fig. 3.

Illustrated in Fig. 4 is a diagrammatic representation of our simultaneous comminuting and dehydrating step which occurs within the confines of the impact mill 45 of Fig. 3. For purposes of illustration, the representative mill casing is divided into vertical sections with appropriate descriptive matter applicable to the sections. We have illustrated an air temperature of 400° C. which is a very satisfactory temperature in actual operation. There is no theoretical upper limit to the temperature of the air that we have discovered but from the commercial standpoint of heating the air, we have found that 900° C. to 1200° C. is a commercial upper limit of temperature for heating apparatus commercially available. Temperatures in excess of 300° C. and up to 900° C. permit milling of grain at the maximum rated output of an impact mill, the temperature depending upon the amount of water present in the grain. The lower limit of temperature is fixed by the air temperature necessary for sterilization of the grain during the milling operation and this we have found to be approximately 180° C. However, it is difficult to operate a mill at near capacity with air of this temperature.

The water content of the grain kernels is illustrated as 50% water but the smaller grains may readily have this amount of water content or greater. As mentioned previously, this water content must be reduced to 10% or less to obtain flour and meal with good keeping qualities. The temperature of the grain from the steeping operation is shown as 18° C. which occurs upon cold washing or neutralizing and during the milling operation the grain may be gradually heated to 65° C.

Shown in the first division 45a within the mill body 45 of Fig. 4, is the breaking of the grain kernels into large fragments. It is during this initial part of the comminuting operation that sterilization takes place inasmuch as the air is hottest at this region. While the body or interior of the various fragments or pieces is very slightly heated by the hot air, the outermost layer of each particle is heated to a very high temperature as soon as the surface moisture is evaporated. If this temperature is in excess of 180° C. all the fungi and bacteria will be killed instantly and the enzymes are apparently destroyed or at least neutralized. If bacteria or fungi are present in cracks within the grain, the grain will invariably break along these cracks, exposing these surfaces to the full temperature of the hot air blast. This surface heating during this initial stage 45a is only on the very extreme surface and probably does not penetrate more than one thousandth of an inch.

While all details are not known, this sterilizing action is apparently aided by a natural glazing effect wherein the heat forms a glaze or crust on the exterior of the grain. This glaze seals the interior moisture of the grain so that it is not effective for evaporative cooling. This permits the exterior of the grain to be heated to very high temperatures and the sterilizing action seems to be substantially independent of the water content.

The exposure of the very wet and soaked kernels to the hot blast immediately dries the surface of the particles preventing any sticking or gumming of these particles regardless of the amount of water immediately below the surface. Therefore in spite of the relatively high water content in the first stage which may be as great as 45%, the particles react to the impact mill in much the same fashion as dry materials being broken in an impact mill. No collections of wet materials are possible which is important inasmuch as a small amount of accumulation of soggy or wet material would not only reduce the efficiency of the mill but could slow it down and stop the motor entirely.

The grain kernels are broken into particles by the rapidly whirling hammers of the impact mill and the hot air blasted through the mill immediately dries any fresh surfaces formed by the progressive comminution. The hammers also beat to pieces the germ of the kernel, spewing its fats and oils on nearby particles, dispersing this oil over particles from all parts of the kernel. The oil is thus subjected to the heat at its maximum effectiveness since the outermost film of a particle is least affected by evaporative cooling. While enzymes withstand high temperatures in a body of oil, they are rendered inactive at lower temperatures when present only in a film of oil. The effect of the mechanical smashing of the germs and dispersion of fats and oils together with the heat of drying is to render the enzymes still more inactive, and apparently deadening or destroying them.

The enzymes of the stepped grain delivered to the mill are weakened or debilitated due to the conditioning of the steeping. This preparatory weakening makes possible the positive deadening of the enzymes in the simultaneous comminuting and dehydrating step.

We have further discovered that the enzymes that cause rancidity may be kept in their deadened or immobilized conidtion, or the destroyed enzymes may be prevented from reactivating, by placing the flour in a dehydrated condition. The dehydrating action accompanying the comminution should be so regulated that the final comminuted product has a water content not greater than about 10% and preferably between 5 and 8%. If a water content of 14 or 15% is used the lipase enzymes can reform or regroup within a few months, whereas products of 5% water content can store for a year or more without turning rancid.

The progress of the comminution is clearly illustrated in Fig. 4 wherein the particles become progressively smaller as they pass through sections 45b, 45c, 45d, and 45e. The water is evaporated off of the surface of the particles and the smaller the particles become the greater is the total exposed surface. Therefore the evaporation of the water is greatest in sections 45c and 45d and the drop in air temperature is greatest here also because of this absorption of water by the air. As the grain particles become smaller they are heated up faster and accordingly the greatest increase in temperature of the grain particles occurs in these sections also. While the turbulence of the air within the mill is very great, there is a general flow from inlet to outlet that carries the materials along so that comminution from one size takes place in different regions of the mill.

In the last section 45e the particles must pass through the centrifugal separator 53. If any of these are of large size or high mass they will be thrown outwardly where they will strike the inclined surface 51a to be returned to the region of the hammers for further comminution, as illustrated by the arrows leading toward the left. The fine material having the proper size will be carried through the centrifuge separator by the blast of air passing through the mill and will be carried through the blower 54 (Fig. 3) to the cyclone for settling.

The foregoing general description of the comminuting and dehydrating step is of general applicability. The size of the impact mill employed is not critical and we have found that the peripheral velocity of the hammers may be used as the governing factor in the mill operation or selection. We find that the most satisfactory peripheral speed for large kernel grain is between 3500 and 5000 meters per minute which, of course, is the product of the circumference of the rotative parts of the mill and the revolutions per minute.

The temperature of the flour is preferably in the range of 65° C. and 73° C. and should not exceed these values. If flour is heated much above these values, the action of the gluten is impaired and dough from such flour lacks elasticity and plasticity.

We have found out in testing prior processes that water contents for flour of about 15% are excessive, causing spoilage of the flour after a few months. We have found that for long keeping qualities, that is about a year, the finished flour should have a water content of 10% or less by weight. In actual practice we prefer to have flours in the range from 6% to 8% water content.

EXAMPLES

The following are given as examples only. Various other tests indicate that the entire ranges of temperature, time, pH and product temperature may be used for cereal grains. The following are examples of the treatment of the five cereal grains in accordance with the present invention, all were performed in Mexico City, Mexico, the elevation being approximately 7,500 feet above sea level.

*Wheat*

Wheat may be steeped in alkali to produce a fine whole wheat flour of many baking uses. An aqueous solution of mixed $Ca(OH)_2$ and $NaOH$ (approximately equal parts) may result in pH 14. Steeping may be at 82° C. for about half an hour. A steeping temperature of 78° C. may also be employed for three-quarters to one hour with some increase in water content over the half hour steeping. The steeped grain may then be washed at 76° C. for 10 minutes and neutralized at a 70° C. with phosphoric acid of pH 1.2–2 for 10 minutes. The neutralized warm grain is next simultaneously comminuted and dehydrated employing air blasts in excess of 180° C., such as 450° C. The resulting flour is not as fine as white wheat cake flour, but is satisfactory for nearly all baking requirements, but because of its hydrolyzed bran content it requires approximately 50% more water to form dough. The flour may emerge at a temperature of 70° C. and may have a water content from 6% to 9% by weight. Cooling the grain before comminuting causes the bran to shrink off of the kernel and is to be avoided.

Wheat may be acid steeped by 12% hydrochloric acid in aqueous solution (pH .8) for a quarter hour at 76°–78° C. It may then be washed for 20 minutes at 78° C., neutralized with calcium hydroxide solution of pH 13 for 15 minutes and washed in water at 76° C. for 10 minutes. Thereafter it may be comminuted in an impact mill and simultaneously dehydrated by hot air or products of combustion at 350° C. This product is whiter in color than the alkali steeped wheat and absorbs somewhat less water.

Hot water steeping produces a wheat grits product coarser than graham flour having an excellent taste. The steeping may be carried out at 78° C. for one hour, resulting in a water content of about 55%. Simultaneous comminution and dehydration may be carried out at 450° C. to 500° C. to produce a water content of 8%.

An excellent white flour may be formed by employing our process wherein the hull or bran is removed but the germ and fat and oils are retained. Acid steeping with hydrochloric or phosphoric acid at pH 4 may be used for one hour or less at 76° to 78° C. The acid steeped grain is then rapidly tumbled in a rotating drum in a hot water wash of 70° C. for about 10 minutes resulting in all of the hulls being rubbed off of the endosperm and with some loss (about 40%) of germ. The hulls may then be removed by a rotation step. The dehulled wheat bodies are then neutralized in calcium hydroxide solution of pH 11.5–12 for 10–15 minutes, the time depending upon the desired pH. The simultaneous comminuation and dehydration may be carried out at 450° to 500° C. to give a final product of 8% water content, 6.6–7 pH and good keeping qualities. The flour is fairly white, its dough more sticky than ordinary white wheat flour, the taste is good and the texture fine so that 100% will pass 80 mesh and 90% will pass 120 mesh.

Rye

Water steeped rye will produce a coarse meal or ground product with good keeping qualities with characteristic rye taste. Steeping for one hour at 78° C. results in a water content of 68%. Simultaneous comminution and dehydration at 650° to 700° C. produces the grits, which have a very low flour content.

The alkali steeping of rye is very similar to wheat, and produces flour of excellent taste. Steeping may be at pH 14, at 82° C. for a half hour, with washing at 76° C. for ten minutes and neutralization at 70° C. at pH 1.2–2 for ten minutes. Simultaneous comminution and dehydration may be at 450° C. to produce a fine product of pH 6.5 to 6.8.

Acid steeping causes the bran to darken in color, producing a dark flour of acceptable taste. The pH may be 0.8 for 7–10 minutes at 80°–82° C. or pH .5 for 2 minutes, with some loss of bran to the acid. Then washing and neutralizing to pH 6.5 to 7 may be used, with simultaneous comminution and dehydration at 500° C. The general wheat procedure is applicable to rye.

Barley

The field threshed barley must have the hull (lemma and palea) removed, leaving the endosperm surrounded by a thin bran coat. Hot water steeping at 78° C. for one hour gives a water content of about 60% and simultaneous comminution and dehydration may be at 500° to 550° C. A flour results.

Alkali steeping produces a very tasty flour that produces a dough stickier than water steeped flour. The bath may be calcium hydroxide pH 11.5–12 continued for a half hour at 72°–76° C. The water wash may be for 30 to 40 minutes at 70°–72° C. and neutralization may be in phosphoric acid at pH 4 with a momentary dip only of about a minute duration. Simultaneous comminution and dehydration may be at 450° to 600° C. The final flour is fine, pH 6.8–7, but conventional quantities of rising agents do not act on the dough. The flour may be mixed with corn flour to give higher elasticity to the corn flour.

Acid steeping of barley, oats and rice causes a gumming of the aleurone layer and great care must be exercised to obtain a comminuted product. Acid steeping of pH 4 for 10 minutes at 72°–76° C. may be followed by a hot water wash of 72°–76° C. for about one hour. There is a tendency for the kernels to stick together and comminution may be at 500° C. to produce a fine flour of 8% water content.

Oats

Oat groats may be water steeped in the same fashion as barley. Simultaneous comminution and dehydration may be at 650° C. to produce a final flour of 2% water content that has an excellent taste, bakes well, and makes an excellent cooked breakfast food.

Alkaline steeping oat groats results in a flour of excellent taste that is sweeter than water steeped groats, and darker in color. The dough is stickier than with water steeping. The alkali steeping may be in calcium hydroxide solution at 78° C., pH 11.5–12 for half an hour and then washed at 76° C. for half an hour. Without neutralization pH 7 results. Keeping times of 6 months are readily obtainable with 8% water content flour.

Acid steeping is similar to that for barley. Phosphoric acid at pH 4 for 10 minutes at 72° C. – 75° C. may be used with a hot water wash for an hour at 72° C. – 76° C. The product is a fine flour.

An excellent ground product, high in bulk or fiber, may be obtained from field threshed oats. That is, the hull is still in place, which hull is removed in obtaining oat groats. The product is especially beneficial for the relief of constipation, but in contrast to most roughage products, is tasty, pleasant, nutritious and rich in vitamin. Alkaline steeping also produces mucilaginous compounds which replace the deficiency of this material occurring during constipation. The alkaline bath may be a CaO and NaOH mixture of pH 14 and steeping may be at 82° C. but because of the extra covering, must be continued for one hour. It may then be water washed at 76° C. for 10 minutes followed by a phosphoric acid neutralizing bath at pH 4 for about a quarter hour until grain pH is 7. Simultaneous comminution and dehydration may be at 650°–700° C. to produce a product of 8% at 72° C.

Rice

Unpolished or brown rice, like barley and oat groats, has a thin bran layer. It may be water steeped at 78° C. for one hour and comminuted at 450° C.–600° C. to produce a flour.

Alkali steeping is the same for oats, with 20 minutes at pH 11.5–12 at 76° C., followed by 40 minute washing in hot water. Simultaneous comminution and dehydration may be at 350°–400° C. to produce a product of pH 7 of 8% water content. The flour is nutritious, having added calcium salts.

Acid steeping may be employed in the same manner as barley and oat groats, and will be darker in color.

VARIABLES AND LIMITS

The lowest practicable steeping temperature for effecting the enzyme debilitation of this invention is 68° C., but it is preferable to exceed this temperature. For products which are not gelatinized the highest practicable temperature appears to be 82° C. For products where some degree of gelatinization is desired, 82° C. may be exceeded. The enzyme debilitation takes place in about two hours at 68° C. and with the steeping solution at 82° C. and above, the enzyme debilitation takes place in about half an hour. At 72° C. the steeping time is about one and two-thirds hours and at 78° C. the steeping time is about one hour. Steeping from 68° to 82° C. for two hours to one-half hour respectively does not ordinarily result in gelatinization for the cereal grains when the bran coats are intact. Times in excess of these will generally result in gelatinization.

The enzymes debilitated, as mentioned previously, are the enzymes that cause rancidity such as the lipases and the lecithinases. Other enzymes present in grain are responsive to different temperatures, but the rancidifying enzymes become substantially weakened or debilitated in the presence of moisture at 68° C. or higher for the times specified.

Hydrolyzation of the hulls for producing fine flour may be accomplished, at appropriate pH, substantially within the foregoing time and temperature ranges or combinations for enzyme debilitation. This is preferably done with an alkaline or very strong acid solution to assist the enzyme debilitation by reaction of enzymes with the metals of the alkali, especially calcium and by creating a pH adverse to the enzymes. The lowest practicable pH is 11.5 obtainable with ordinary CaO water solutions and pH 14 seems to be the highest that is commercially obtainable. This highest pH may be obtained with CaO and NaOH water solutions in the temperature ranges mentioned in the foregoing paragraph.

Intermittent mechanical agitation simultaneously with circulation of the bath is required in practice for commercially uniform results.

Steeping with acids of lower pH (1 and below) brings about such a rapid attack on the hull of the grain that part of the steeping time necessary for enzyme control must be spent in hot washing and neutralizing operations. Acid aqueous baths for effecting hydrolyzation of the cellulose of the hull may be between pH 4 and pH 0.2. Phosphoric, hydrochloric and sulphuric acids may be used followed by a suitable wash or neutralization to raise the pH to about pH 7 for all-purpose flours and to above pH 7 for non-yeast flours. Edible acids are preferred for neutralization of grain hydrolyzed by alkali. Washing and neutralization, in some cases, should be performed at lower temperatures than the chemical steeping because water penetration, and hence gelatinization, progresses with time of exposure to water. The chemical attack on the bran of the thin skin grains, oat groats, dehulled barley and brown rice, should be very limited for steeping within the enzyme control range when gelatinization is not desired. The thinner the bran coat the faster the water penetrates to the starch to gelatinize it. For yeast rising products, pH should be pH 6.6 to 7.

In addition to steeping control in terms of time and temperature a microscopic examination of the steeped hull may be employed to determine sufficiency of the chemical steeping. The most practical is to rub off the outer part of the bran, leaving the aleurone layer on the endosperm. Upon microscopic examination, the aluerone layer should be intact, and should be smooth, complete and adhered to the endosperm. If it is loose or rough, then the steeping has progressed too far. For dehulled grain products, the aleurone layer will be disintegrated. Another microscopic test may be made on the bran itself of wheat and rye. The fibers will be tightly adhered together in honeycomb array in raw grain, but in chemically steeped grain will be loose, appearing as individual hairs or fibers.

The simultaneous comminution and dehydration with gases initially not less than the critical minimum temperature of about 180° C. results in sterilization of the product. It is preferable that the dehydrating gases and the steeped grain be fed to the mill in the same conduit so that the whole kernels will receive at least momentary exposure to the hot gases to achieve the sterilizing temperature. There seems to be no upper limit of gas temperature within the practical range of heating, and temperatures for heated air of 900° C. have been satisfactorily employed. Undoubtedly gas at 1200° C. would be satisfactory. Evaporative cooling prevents heating of the grain particles above the critical product temperature and volume and vice versa. The grain is preferably comminuted while still hot from the steeping to maintain temperatures that are adverse to the enzymes.

The upper limit of grain product temperature during dehydration is 73° C. because of the denaturing of the amino acids by the combination of dehydration and temperature. Air saturation, together with the final desired water content, as a practical matter, limits the lower limit of product temperature of about 65° C., although lower product temperatures may be satisfactory. The higher product temperatures are more conducive to continued enzyme control. Product temperatures about 68° C. result in the highest quality for baking and other use and best storage occurs with product temperatures of 73° C.

The water content of the final product is also important in determining the keeping qualities. The practical upper limit of moisture content in the finished product is about 10%. The lower practical limit is not known but final products of water content of 5% have very satisfactory handling and baking properties. Generally, the lower the water content, the greater the keeping time, and ground products of about 10% water content dehydrated with gases about 300° C. will keep for at least a year. If the water content is 5% or thereabouts, the flour will keep for years.

Fine flour or coarse meal may be made by the invention, the coarse meal or grits being obtained when non-chemical steeping is employed. The centrifugal grader of impact mills and the amount of impaction of the mills needs merely to be adjusted to obtain any degree of coarseness for steeped grain. In this specification the words "ground product" and "comminuted product" are used to describe flour and meal.

Throughout this specification the words "flour" and "meal" appear. It will be appreciated that any description applicable to flour is also applicable to meal. We intend to use the word meal generically to include other coarse food products; such as crushed wheat, coarse ground wheat, cracked wheat, grits, and other grits.

While we have described our invention with reference to a specific process, we do not limit ourselves to this specific description nor otherwise, but we include all variations and modifications thereof as fall within the true spirit and scope of our invention.

We claim:

1. The method of producing non-rancidifying cereal grain comminuted products from cereal grains of the class consisting of wheat, rice, oats, barley and rye, comprising: steeping such whole cereal grain in an aqueous bath of not less than 68° C. for not less than a temperature and time combination of about 68° C. to about 82° C. for two hours to one-half hour respectively; and then simultaneously comminuting the steeped grain and dehydrating the steeped grain with hot gases wherein the temperature of the gases is not less than about 180° C. until the water content is not more than about 10%, the initial exposure of the hot gases to the steeped grain destroying bacteria and fungi, and the process destroying the enzymes that cause rancidity.

2. Method of producing non-rancidifying cereal grain ground products as defined in claim 1 wherein the product temperature is controlled at not more than 73° C. during the simultaneous communication and dehydration.

3. The method of producing non-rancidifying cereal grain ground products as defined in claim 2 wherein the aqueous bath is hot water.

4. The method of producing non-rancidifying whole grain ground products as defined in claim 2 wherein the aqueous bath is an aqueous alkaline bath of at least pH 11.5.

5. The method of producing non-rancidifying whole grain ground products as defined in claim 2 wherein the aqueous bath is an aqueous acid bath of at least pH 4 acidity.

6. The method of producing a whole grain comminuted product comprising: steeping grain from the class consisting of wheat, rice, oats, barley and rye, in an aqueous alkali bath, washing the steeped grain in hot water, and neutralizing the washed grain in an aqueous acid bath, at least two of said operations taking place with aqueous temperatures in the range of 68° C. to 82° C. for a total time of two hours to one-half hour respectively; and simultaneously comminuting and dehydrating the grain, employing hot gases of not less than 180° C. until the water content is not more than 10% by weight, the initial exposure of the hot gases to the steeped grain destroying bacteria and fungi, and the process destroying the enzymes that cause rancidity.

7. The method of producing a whole grain comminuted product comprising: steeping grain from the class consisting of wheat, rice, oats, barley and rye, in an aqueous acid bath, washing the steeped grain in hot water, and neutralizing the washed grain in an aqueous alkaline bath, at least two of said operations taking place with aqueous temperatures in the range of 68° C. to 82° C. for a total time of two hours to one-half hour respectively; and simultaneously comminuting and dehydrating the grain, employing hot gases of not less than 180° C. until the water content is not more than 10% by weight, the initial exposure of the hot gases to the steeped grain destroying bacteria and fungi, and the process destroying the enzymes that cause rancidity.

8. The method of preparing a general utility whole wheat flour comprising: steeping whole grain wheat kernels in an aqueous bath having approximately equal amounts of CaO and NaOH of about pH 14 in the range from about 78° C. to 82° C. for a period in the range of about one hour to one-half hour respectively; neutralizing the steeped wheat with an edible acid until the wheat has an average pH of about 7; comminuting the steeped wheat; and simultaneously with the comminuting, dehydrating the wheat with hot gases wherein the temperature of the gases is not less than about 180° C. until the final product has a water content not greater than about 10%, the initial exposure of the hot gases to the steeped wheat destroying bacteria and fungi, and the process destroying the enzymes that cause rancidity.

9. The method of preparing a non-rancidifying wheat flour having a substantial part of the natural fats and oils comprising: steeping whole grain wheat in an aqueous acid bath about pH 4 at 76° C. to 82° C. for about one hour to one-half hour respectively; then neutralizing the grain in an aqueous alkaline bath of about pH 13; and then comminuting the neutralized wheat, while simultaneously dehydrating the wheat with hot gases heated to not less than about 180° C., until the water content is not in excess of about 10%, the initial exposure of the hot gases to the steeped wheat destroying bacteria and fungi, and the process destroying the enzymes that cause rancidity.

10. The method of preparing a whole grain flour from the cereal grains of the class consisting of wheat, rice, oats, barley and rye that have thin bran coats when the outer hull is removed comprising: steeping such whole grain kernels in an aqueous alkaline bath of about pH 11.5 from 68° C. to 76° C. for about one hour to one-half hour respectively; and then simultaneously comminuting and dehydrating the grain, employing the direct action of heated gases of not less than about 180° C. until the water content is not more than 10%, the drying taking place such that the steeped grain temperature is not above about 73° C., the initial exposure of the heated gases to the steeped grain destroying bacteria and fungi, and the process destroying the enzymes that cause rancidity.

11. The method of preparing a comminuted oat product that is partly gelatinized comprising: steeping whole grain field threshed oat kernels having the hull in place in an aqueous alkaline bath of CaO and NaOH mixture having a pH of about 14 at a temperature from 78° C. to 82° C. for a period not less than one and one-quarter hours; neutralizing the steeped grain by steeping in a bath of phosphoric acid of pH 4 or greater acidity until the grain reaches about pH 7; comminuting the steeped oats; and simultaneously with the comminuting, dehydrating the steeped oats by hot gases having an initial temperature of not less than 180° C., until the water content is not in excess of about 10%, the initial exposure of the hot gases to the steeped oats destroying bacteria and fungi, and the process destroying the enzymes that cause rancidity.

References Cited in the file of this patent

UNITED STATES PATENTS

| | | |
|---|---|---|
| 826,983 | Phippen | July 11, 1906 |
| 987,560 | Erosa | Mar. 21, 1911 |
| 1,061,933 | Willford | May 13, 1913 |
| 1,268,960 | Lopez | June 11, 1918 |
| 1,334,366 | Garza | Mar. 23, 1920 |
| 1,423,830 | Christensen | July 25, 1922 |
| 1,662,401 | Sasseen | Mar. 13, 1928 |
| 1,152,367 | Smith | Mar. 28, 1939 |
| 2,509,418 | Brown | May 30, 1950 |
| 2,535,570 | Gordon | Dec. 26, 1950 |
| 2,584,893 | Lloyd | Feb. 5, 1952 |
| 2,585,978 | Van Atta | Feb. 19, 1952 |
| 2,704,257 | De Sollano et al. | Mar. 15, 1955 |
| 2,854,339 | De Sollano et al. | Sept. 30, 1958 |